RELAYLESS LINE FINDER CIRCUIT

Filed Jan. 13, 1950 2 Sheets-Sheet 1

INVENTOR.
ROBERT BERTOLD BUCHNER.
JAN BORCHERDING.
BY Fred M Vogel
AGENT.

INVENTORS.
ROBERT BERTHOLD BUCHNER
JAN BORCHERDING
BY Fred M Vogel
AGENT

United States Patent Office 2,697,750

Patented Dec. 21, 1954

2,697,750

RELAYLESS LINE FINDER CIRCUIT

Robert Bertold Buchner and Jan Borcherding, Hilversum, Netherlands, assignors to Hartford National Bank and Trust Company, Hartford, Conn., as trustee Application January 13, 1950, Serial No. 138,361

Claims priority, application Netherlands January 17, 1949

3 Claims. (Cl. 179—18)

The invention relates to relayless line finder circuit, for example a telephone system, in which the *a*- and *b*-wires are connected to multipled bank contacts of line finder switches and selector switches.

The line may, for example, constitute a connection between a subscriber's station and a group of first call finder switches and final selector switches in a telephone exchange or the connection between a private branch exchange and local exchange.

Circuit-arrangements are known which do not comprise line relays and which are provided with a plurality of individual resistances. A first resistance connects one of the *a*- and *b*-wires to a point of first potential, for example, one of the terminals of a supply battery, the other wire being connected through a resistance to a test wire, which is connected not only to multipled test contacts of the various call finders but also to multipled contacts of the final selectors. The test wire is furthermore connected through a third resistance to a point of second potential, for example, the other terminal of the battery.

Other lines are connected in a similar manner to the further outlets of the switches.

If a line finder is finding a calling line, the control device tests, by way of a testing wiper of the switch, the potential of the call test contacts associated with the testing wiper and connected to the test wires.

In the normal position (which is to be understood to mean herein the situation in which the loop across the line is open and no call finder or selector has engaged the line outlet), the test wire has a normal potential such that the control device of a line finder is not actuated. In practice the normal potential is not necessarily equal to the second potential, since as a rule a certain leakage current will flow through the line loop.

When a call is set up, the test wire owing to the completion of the loop across the line, assumes a potential such that under the control of the control-device the switch is stopped on an outlet thus marked. In the known circuit-arrangements, the testing wiper of the switch is then connected to the point of second potential, with the result that the calling condition is terminated.

If a selector engages the line outlet, the test wire of the line circuit is also connected to the point of second potential through a relay contact and a contact wiper of the selector in order to prevent the line from being marked calling due to the completion of the line loop during the reply to the call.

In the known arrangements for indicating whether a line is free or busy separate marking contacts are provided on the selectors. After a selector has reached the desired outlet, the line is marked busy by applying "busy" potential to the contact in question.

Conversely after the setting of a call finder the line is marked busy for final selectors by supplying busy potential to busy test contacts of the selectors through a wiper of the call finder associated with the latter contacts.

In the known circuit-arrangements both the call finders and the selectors require additional wipers for marking the line engaged for a switch of the other kind.

Control-devices for call finders and selectors are known with the use of which the potential of test contacts is tested by electronic means and the potential of a test contact on the associated line becoming engaged is varied by electronic agency. Circuit-arrangements of this kind are described in the copending U. S. patent applications Serial No. 66,679, filed December 22, 1948, now Patent No. 2,662,119; Serial No. 107,412, filed July 29, 1949, now Patent No. 2,640,883 and Serial No. 120,248, filed October 8, 1949, now Patent No. 2,663,760.

With the use of such circuit-arrangements the result is obtained that two call finders or selectors are substantially prevented from marking a line busy at approximately the same time since the interval between the commencement of testing and the variation of the marking potential is extremely small. However, with these circuit-arrangements there is still the risk that a call finder and a selector may stop at the same line, since, when a switch of one kind has engaged the line, the outlet for a switch of the other kind is not engaged until a relay is energized.

In a known circuit-arrangement, the test contacts of the selectors are connected to a tapping on a resistance connected between one of the *a*- and *b*-conductors and the point of first potential, the line being marked free for final selectors, if the potential of the busy marking contact is equal or substantially equal to the first potential and being marked busy, if the potential of the test contact is different therefrom. Thus, on the receiver being lifted and on the line loop being completed, the line is immediately marked busy for selectors.

However, if the subscriber lifts the receiver at the moment the final selector engages the line, the line is marked as calling for a short period until the moment a relay contact is closed, which connects the call test contact to the point of second potential. During this short period the possibility that a call finder may stop at the line consequently does exist.

The object of the invention is to provide an improved circuit-arrangement for use in automatic signalling systems.

According to the invention, a circuit-arrangement for use in automatic signalling systems, in which the *a*- and *b*-wires are connected to bank contacts of line finder and selector switches, one of the wires being connected through a first resistance to a point of first potential and the other wire being connected through a second resistance to a test wire, which is connected to multipled test contacts of the line finders, to multipled contacts of the selectors and through a third resistance to a point of second potential, the test wire having in the normal position a potential such that a control-device of a line finder which tests this potential through a testing wiper is not actuated and the test wire upon the completion of the line loop and as long as the outlet is not engaged by a switch assumes a potential such that the control-device of a line finder switch is actuated and stops the line finder switch is characterized in that, when a selector switch reaches a desired control, the control-device associated with this selector switch tests the potential of the test wire and derives therefrom the criterion whether the line is free or busy the outlet being marked free by the normal potential and being marked busy by the busy potential, and in that furthermore upon the engagement of the line outlet by a line finder switch or a selector switch, the testing wire is supplied through the wiper of the switch with a potential such that the line outlet is marked busy for further line finder switches and selector switches.

If use is made of switches which may be used either as first call finder switches or as final selector switches a switch is to be understood to represent a call finder or a selector according to its function. In such combined switches the criterion that a call is being made and the criterion that the line is engaged by a final selector are consequently supplied by the same test contact.

It should be noted that a circuit-arrangement is known in which the same test contact serves both for indicating that a call is being made and that the line is engaged by a final selector. However, in this circuit-arrangement use is made of two relays for each line circuit.

In order that the invention may be more clearly understood and readily carried into effect, it will now be described more fully with reference to the accompanying diagrammatic drawing showing, by way of example, two embodiments thereof.

Figure 1:
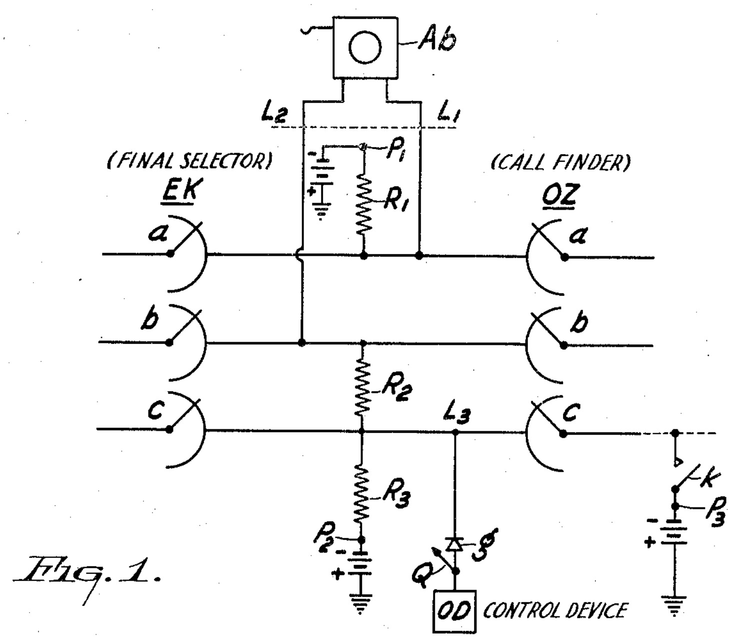
Fig. 1 is a schematic circuit diagram of a first preferred embodiment of an automatic signalling system in accordance with the invention.

Referring now to Fig. 1, a subscriber's station A*b* is connected through a line loop L1 and L2 and the *a*- and *b*-wires to bank contacts *a* and *b* of a group of first call finders OZ and a group of final selectors EK. For the sake of simplicity the figure shows only one switch of each group. Corresponding contacts of the switches of each group are assumed to be multipled, in known manner.

The loop wire L1 is connected through a resistance R1 to a point P1 of voltage supply for example, of —60 v. A resistance R2 is connected between the loop wire L2 and a test wire L3. The test wire L3 is connected directly to a *c*-contact of each call finder OZ and a *c*-contact of each final selector EK and through a resistance R3 to a point P2 of voltage supply for example of —20 v. A control device OD is actuated when a call is made and is common to the group of subscribers connected to the outlets of finders OZ and selectors EK. The control device OD is connected through a rectifier *g* to a test wire L3 of each line circuit of the group. The various line circuits are relatively decoupled in known manner by the rectifiers.

A point Q common to a number of control devices OD has usually a potential of —30 v. and in the normal position of the line circuit the testing wire L3 has a potential tial of —20 v., the rectifier *g* being cut off and the control device OD being in the normal position. In practice the potential of the test wire L3 will be slightly lower than —20 v. owing to the leakage current passing through the line loop L1—L2.

During the positioning of a call finder OZ or a final selector EK a control-device OD associated with the switch tests the potential of the test wire L3 through the *c* wiper of the switch.

The control-device OD of the finder OZ has a threshold such that this device cannot respond and stop the switch, unless the marking potential of a *c*-contact is lower than —30 v.

In normal cases the control-device of a final selector EK is not capable of terminating the movement of the selector when a line corresponding to the desired number is reached, unless the potential of the *c*-contact lies between —20 and —30 v. The line is consequently marked engaged to final selectors, if the *c*-contact potential is lower than —30 v. or exceeds —20 v. The control-device OD may be arranged such that the operator can cut in.

In the normal position the line is marked free.

Thus, when a subscriber lifts the receiver, a circuit is completed from the point P1 (—60 v.) through resistances R1, loop line L1, subscriber's station A*b*, loop line L2, resistance R2, resistance R3 to point P2 (—20 v.). If the resistance R1, R2 and R3 are identical, the *c*-wire L3 assumes a potential of —33⅓ v. The rectifier *g* then becomes conductive and the control device OD becomes operative, so that one or more call finders will find the calling line which is marked by a marking voltage of —33⅓ v. Simultaneously with the completion of the connection, the line is marked engaged to final selectors.

As soon as the calling line is found the potential of the test wire L3 is raised to earth potential by the control-device OD preferably by electronic agency, through the *c*-wiper, so that the calling condition is terminated and the control-device OD reassumes its normal position.

A further call finder is thus prevented from stopping at the given outlet, and in addition the outlet remains marked engaged for final selectors.

The test conductor is then connected, through contact *k*, to a point P3 having a third potential, in order that the outlet may be permanently marked engaged.

If at a *c*-contact of a desired outlet the control-device of a final selector finds a potential between —20 v. and —30 v., which shows that the outlet is not engaged by a further switch and the line also is not in a calling condition the potential of the *c*-contact is also raised to earth potential.

The circuit-arrangement shown in Fig. 1 has a limitation in that in the normal position the potential of the test wire L3 depends on the value of the leakage current occurring between the *a*- and *b*-wires. As a rule this is undesirable and inadmissible, if the final selectors are adjusted numerically in accordance with a voltage-comparison method and the value of the potential of the test wire is required to constitute a numerical indication. In this case the points P2 of the various line circuits have not all identical potential, their potential being characteristic of one or two digits of the line number. The potential may lie for example, between —10 v. and —30 v. with jumps of 2 v.

In the circuit-arrangement shown in Fig. 1 there is the danger that with the occurence of line leakage currents, the value of which is generally not constant with time, the marking potential of a definite number may be converted into a potential corresponding to a different number, so that the selector may not be correctly positioned.

Figure 2:
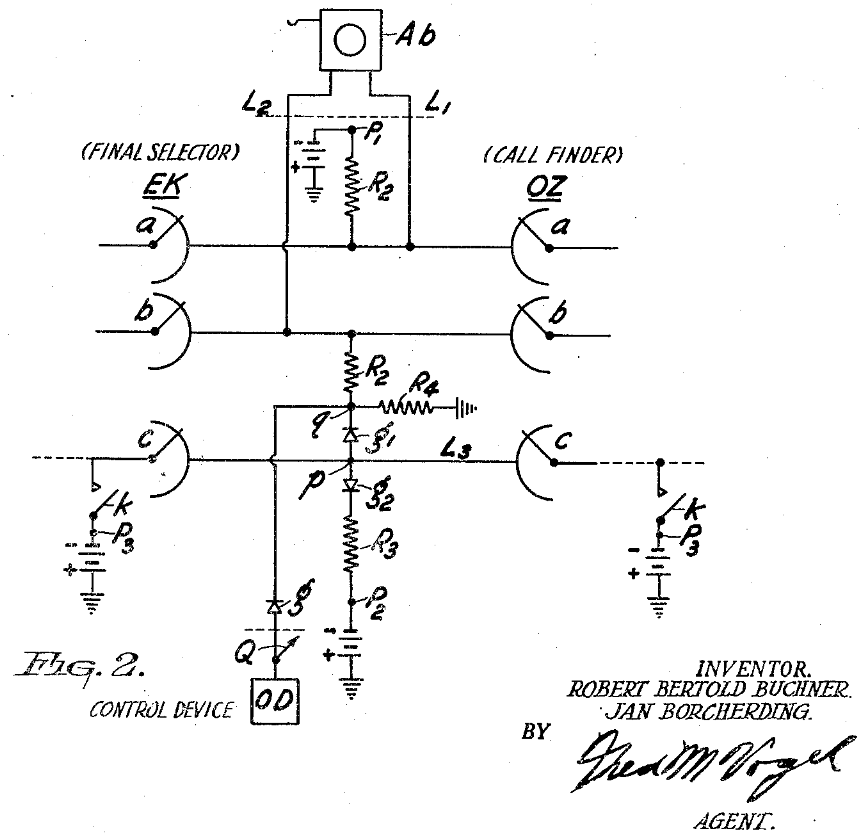
Fig. 2 is a schematic diagram of a second preferred embodiment of the invention.

In the circuit-arrangement shown in Fig. 2 a rectifier *g*1 is connected between the resistance R1 and the test wire L3, whilst the point *q* common to R2 and *g*1 is connected through resistance R4 to earth potential.

Line leakage currents may now follow a path from P1 through R2, the leakage resistance between the *a*- and *b*-wires, resistance R2, resistance R4 to earth. If the leakage currents do not assume inadmissibly high values, the potential of point *q* exceeds that of point *p* (the test wire). In this case the rectifier *g*1 is cut off.

Thus, substantially no current flows through resistance R3, so that the potential of point *p* is equal to that of point P2 and within the tolerance limits does not vary with the line leakage.

It is obvious that resistance R4, the function of which is to provide a path for the leakage currents to leak away, may be connected to the *b*-wire or to a tapping on resistance R2 instead of the point *q*.

In contradistinction to the circuit-arrangement of Fig. 1 the call detector OD is connected to point *q*.

The completion of the line loop has the effect of decreasing the potential of point *q* to, for example, —35 v., so that the call detector OD becomes operative and the rectifier *g*1 becomes conductive, so that the potential of the test wire is varied accordingly and the line is marked calling for call finders and engaged for final selectors, since now the potential of the *c*-wire L3 no longer corresponds to one of the numerical potentials.

Test wire L3 and resistance R3 have connected between them a rectifier *g*2, which is conductive in normal position or in other words the potential of point P is substantially equal to that of P2, and in the event of a call rectifier *g*2 is cut off. Due to this measure, the resistance R3 constitutes no load on the line circuit during a call, so that a greater variation of the potential of L3 can be obtained.

Figure 3:
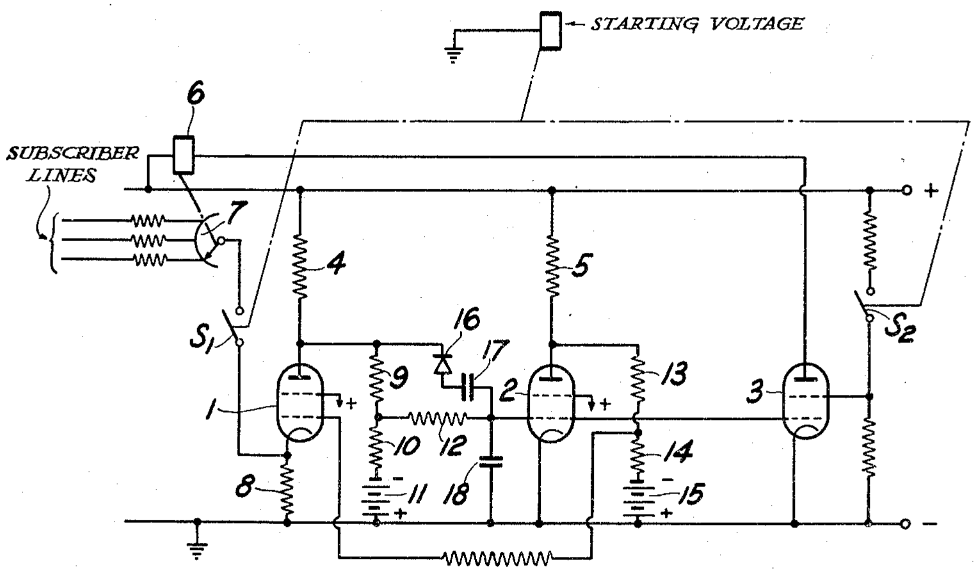
Fig. 3 is a schematic diagram of the control device OD of Figs. 1 and 2.

A control device suitable for operation in the circuits shown in Figs. 1 and 2 as element OD is illustrated schematically in Fig. 3, this device being more fully described in the copending application Serial No. 66,679, filed December 22, 1948.

The control device operates in conjunction with a switch 7 having a series of fixed contacts each connected to a test wire of a line, the fixed contacts being successively engaged by a contact arm actuated by an electromagnet 6.

A flip-flop circuit is provided including electron discharge tubes 1 and 2 whose grid and anode circuits are cross-coupled. The cathode circuit of tube 1 includes a resistance 8 biasing the tube normally to cut-off, the flip-flop circuit having two quiescent conditions; namely, an initial condition in which tube 1 is non-conductive and tube 2 conductive, and an operative condition in which the reverse relationship exists.

The line to be found has a direct potential thereon which is negative with respect to the direct potentials on the other lines connected to switch 7. The arm of the switch is connected to the cathode of tube 1 so that the tube is rendered conductive only when the direct potential of the desired line is applied thereto, thereby rendering the second tube non-conductive. The grid of the second tube is connected to the grid of a third tube 3 which is rendered simultaneously non-conductive, the output circuit of this third tube including electromagnet 6 which is thereby de-energized to arrest the arm of switch 7 at the desired contact. The conduction of tube 1 in the operative condition of the flip-flop circuit reduces the potential on the found line to substantially the value of the other lines, thus marking it busy.

What we claim is:

1. An automatic signalling system comprising line finder and selector switches provided with bank contacts, multipled test contacts and wipers therefor, *a*- and *b*-wires connected to the bank contacts of the finder and selector switches, a test wire connected to the test contacts of the finder and selector switches, a subscriber's line loop connected across the *a*- and *b*-wires, a control device for each of said switches and provided with a test circuit electrically coupled to said test wire to test the potential thereof and including a mechanism operatively coupled to the wipers of the associated switches to drive same depending on the value of the tested potential, a first resistance connecting one of the *a*- and *b*-wires to a point of first potential, a second resistance connecting the other of said *a*- and *b*-wires to said test wire, a third resistance connecting said test wire to a point of second potential, said test wire having in the free condition of said line loop a potential at which the control device is not actuated, said test wire assuming in the calling condition of said line loop a potential at which the said control device is actuated to arrest the line finder at the calling line, means whereby when a selector switch reaches a desired contact the control device associated therewith tests the potential established on the test wire and derives therefrom a criterion indicative of whether the line outlet is free or calling, and means responsive to the engagement of the line outlet by a line finder switch or a selector switch to supply the test wire through the wiper of the engaged switch with a potential marking said line outlet busy to other switches.

2. A system, as set forth in claim 1, further including a rectifier connected between the test wire and the second resistance, and a fourth resistance for connecting in the open condition of said loop a potential to the terminal of the rectifier on the side of the second resistance having a value at which the rectifier is cut off in said open condition whereas in the closed condition the rectifier is conductive if the switch has engaged the line outlet.

3. A system, as set forth in claim 1, further including a rectifier connected between the test wire and the third resistance.

References Cited in the file of this patent

UNITED STATES PATENTS

| Number | Name | Date |
|---|---|---|
| 1,560,725 | Powell | Nov. 10, 1925 |
| 1,723,524 | Rosa | Aug. 6, 1929 |
| 2,322,864 | McCarthy | June 29, 1943 |
| 2,574,224 | Obermann | Nov. 6, 1951 |

OTHER REFERENCES

"The Bridge Marker Key Automatic Switching System," Obermann, chapter 4, 1947 (7½ pages).